(12) United States Patent
Janzen et al.

(10) Patent No.: US 7,648,751 B2
(45) Date of Patent: Jan. 19, 2010

(54) TOUCH FASTENER PRODUCTS

(75) Inventors: Daniel Lee Janzen, Brampton (CA); Kevin Keith Line, Port Severn (CA)

(73) Assignee: Velero Industries B.V., Curacao (NL)

( * ) Notice: Subject to any disclaimer, the term of this patent is extended or adjusted under 35 U.S.C. 154(b) by 181 days.

(21) Appl. No.: 11/873,124

(22) Filed: Oct. 16, 2007

(65) Prior Publication Data

US 2008/0090048 A1   Apr. 17, 2008

Related U.S. Application Data

(60) Provisional application No. 60/829,822, filed on Oct. 17, 2006.

(51) Int. Cl.
*A44B 18/00* (2006.01)
(52) U.S. Cl. .................. 428/99; 428/100; 428/900; 24/442
(58) Field of Classification Search .............. 428/99, 428/100, 900; 24/442
See application file for complete search history.

(56) References Cited

U.S. PATENT DOCUMENTS

| | | | |
|---|---|---|---|
| 4,470,857 A | 9/1984 | Casalou |
| 4,563,380 A | 1/1986 | Black et al. |
| 4,617,214 A | 10/1986 | Billarant |
| 4,673,542 A | 6/1987 | Wigner et al. |
| 4,693,921 A | 9/1987 | Billarant et al. |
| 4,710,414 A | 12/1987 | Northrup et al. |
| 4,726,975 A | 2/1988 | Hatch |
| 4,775,310 A | 10/1988 | Fischer |
| 4,784,890 A | 11/1988 | Black |
| 4,794,028 A | 12/1988 | Fischer |
| 4,802,939 A | 2/1989 | Billarant et al. |
| 4,814,036 A | 3/1989 | Hatch |
| 4,842,916 A | 6/1989 | Ogawa et al. |
| 4,870,725 A | 10/1989 | Dubowik |
| 4,881,997 A | 11/1989 | Hatch |
| 4,931,344 A | 6/1990 | Ogawa et al. |

(Continued)

FOREIGN PATENT DOCUMENTS

DE           3903847           8/1990

(Continued)

OTHER PUBLICATIONS

PCT/IB2007/004563; Invitation to Pay Additional Fees; Annex to Form PCT/ISA/206—Communication Relating to the Results of the Partial International Search Report dated Jan. 1, 2009 (5 pages).

(Continued)

*Primary Examiner*—Alexander Thomas
(74) *Attorney, Agent, or Firm*—Fish & Richardson P.C.

(57) ABSTRACT

Touch fasteners for use as mold inserts in molding seat foam buns include a sheet-form base a magnetically attractable material disposed on the upper face of the sheet-form base, and a film cover covering the magnetically attractable material wherein maximum slope angle of the film cover, is less than about 75° as measured from the upper surface of the sheet form base to the outside surface of the cover. The magnetically attractable material is a strand of frangible composite constructed to be readily segmented with the seat foam bun during recycling.

15 Claims, 9 Drawing Sheets

U.S. PATENT DOCUMENTS

| | | | |
|---|---|---|---|
| 4,933,035 | A | 6/1990 | Billarant et al. |
| 5,061,540 | A | 10/1991 | Cripps et al. |
| 5,110,649 | A | 5/1992 | Morse et al. |
| 5,180,618 | A | 1/1993 | Kessler et al. |
| 5,259,905 | A | 11/1993 | Gilcreast |
| 5,286,431 | A | 2/1994 | Banfield et al. |
| 5,422,156 | A | 6/1995 | Billarant |
| 5,500,268 | A | 3/1996 | Billarant |
| 5,518,795 | A | 5/1996 | Kennedy et al. |
| 5,540,970 | A | 7/1996 | Banfield et al. |
| 5,606,781 | A | 3/1997 | Provost et al. |
| 5,614,045 | A | 3/1997 | Billarant |
| 5,654,070 | A | 8/1997 | Billarant |
| 5,665,449 | A | 9/1997 | Billarant |
| 5,688,576 | A | 11/1997 | Ohno et al. |
| 5,725,928 | A | 3/1998 | Kenney et al. |
| 5,736,217 | A | 4/1998 | Banfield et al. |
| 5,766,385 | A | 6/1998 | Pollard et al. |
| 5,766,723 | A | 6/1998 | Oborny et al. |
| 5,786,061 | A | 7/1998 | Banfield |
| 5,795,640 | A | 8/1998 | Billarant |
| 5,840,398 | A | 11/1998 | Billarant |
| 5,900,303 | A | 5/1999 | Billarant |
| 5,922,436 | A | 7/1999 | Banfield et al. |
| 5,932,311 | A | 8/1999 | Kenney et al. |
| 5,942,177 | A | 8/1999 | Banfield |
| 5,945,193 | A | 8/1999 | Pollard et al. |
| 5,972,465 | A | 10/1999 | Ohno et al. |
| 6,129,970 | A | 10/2000 | Kenney et al. |
| 6,148,487 | A | 11/2000 | Billarant |
| 6,299,954 | B1 | 10/2001 | Schulte |
| 6,348,252 | B1 | 2/2002 | Kenney et al. |
| 6,460,230 | B2 | 10/2002 | Shimamura et al. |
| 6,463,635 | B2 | 10/2002 | Murasaki |
| 6,468,624 | B1 | 10/2002 | Fujisawa et al. |
| 6,537,643 | B1 | 3/2003 | Poulakis |
| 6,540,863 | B2 | 4/2003 | Kenney et al. |
| 6,596,371 | B1 | 7/2003 | Billarant et al. |
| 6,656,563 | B1 | 12/2003 | Leach et al. |
| 6,668,429 | B2 | 12/2003 | Fujisawa et al. |
| 6,720,059 | B2 | 4/2004 | Fujisawa et al. |
| 2002/0023322 | A1 | 2/2002 | Murasaki |
| 2002/0031637 | A1 | 3/2002 | Obony et al. |
| 2002/0058123 | A1 | 5/2002 | Kenney et al. |
| 2002/0164449 | A1 | 11/2002 | Fujisawa et al. |
| 2003/0099811 | A1 | 5/2003 | Poulakis |
| 2003/0134083 | A1 | 7/2003 | Wang et al. |
| 2003/0214068 | A1 | 11/2003 | Fujisawa et al. |
| 2004/0103503 | A1 | 6/2004 | Leach et al. |
| 2004/0108620 | A1 | 6/2004 | Leach et al. |
| 2004/0128804 | A1 | 7/2004 | Billarant |
| 2005/0196599 | A1 | 9/2005 | Line et al. |

FOREIGN PATENT DOCUMENTS

| | | |
|---|---|---|
| DE | 19956011 | 6/2001 |
| EP | 0 145 603 | 6/1985 |
| EP | 0439969 A1 | 8/1991 |
| EP | 0 621 118 | 10/1994 |
| WO | WO96/25064 | 8/1996 |

OTHER PUBLICATIONS

Letter from Jean Philippe Billarant, President of APLIX informing us of patent application, U.S. Publication No. 2004/0128804 dated Mar. 24, 2009 (2 pages). This referenced published application was previously reported in an IDS dated Oct. 29, 2008 in the current application.

Notification of Transmittal of the International Search Report and the Written Opinion of the International Searching Authority or the Declaration; International Search Report; Written Opinion of the International Searching Authority dated Mar. 31, 2009 (15 pages).

PCT/IB2005/002140 International Search Report and Written Opinion, PCT, dated Oct. 10, 2005.

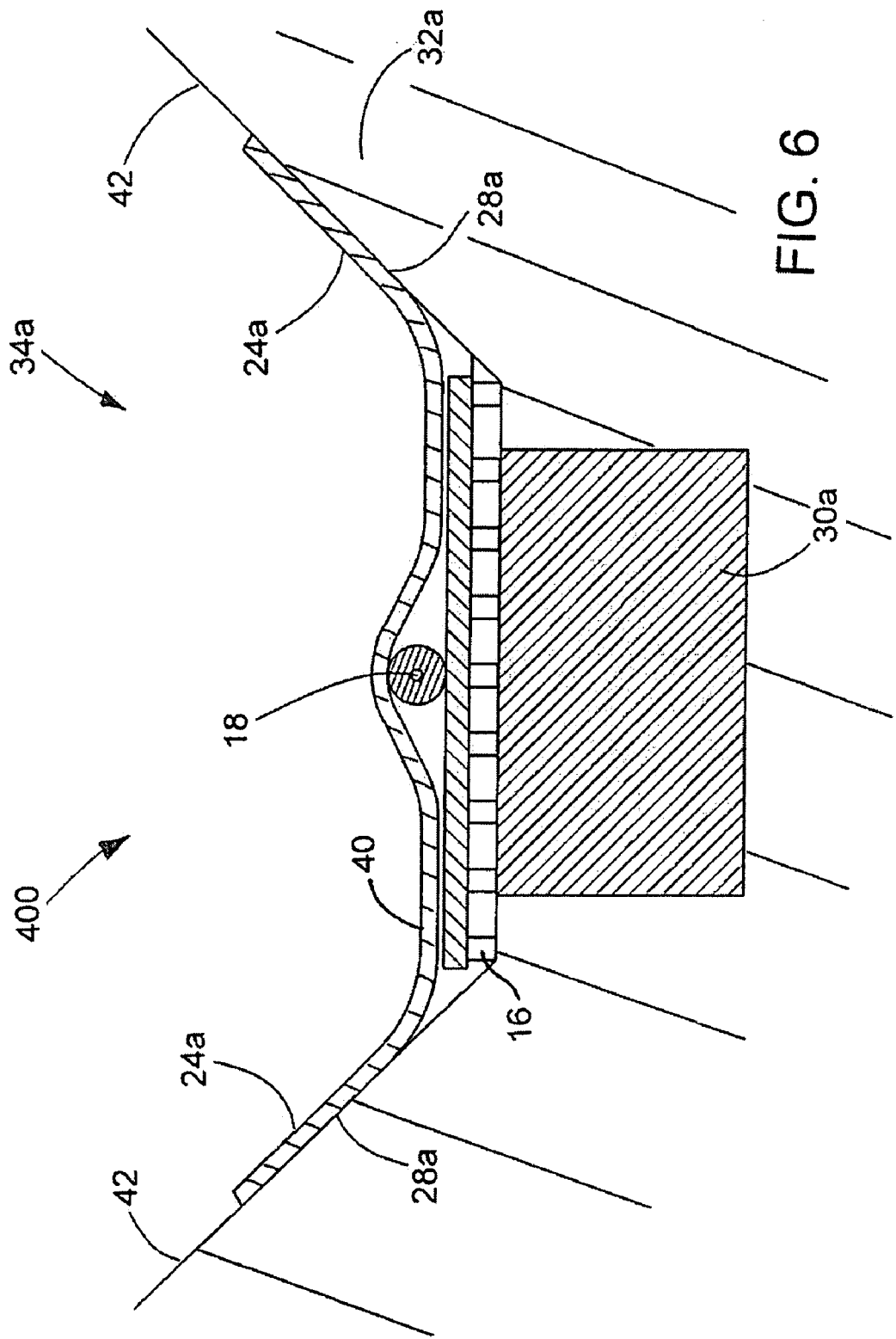

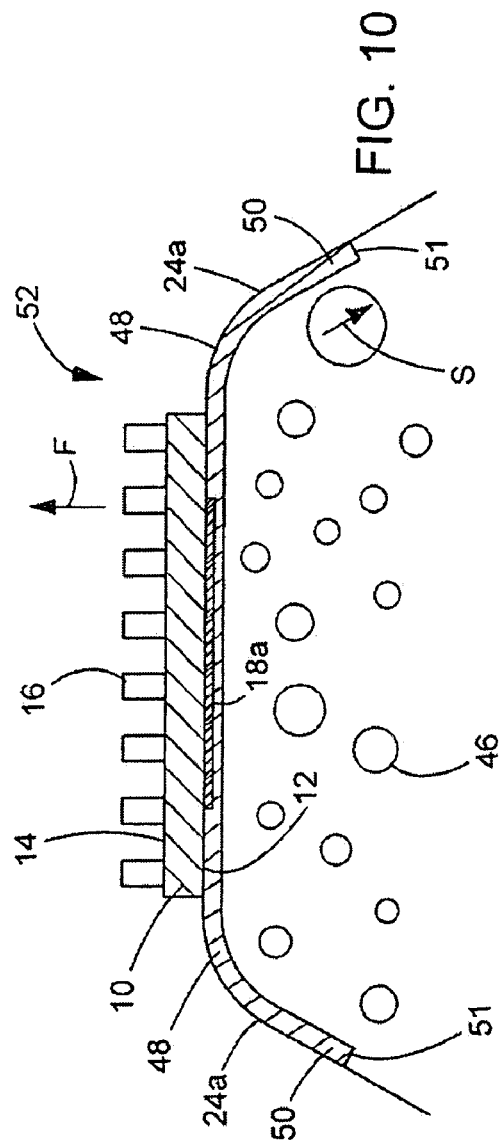
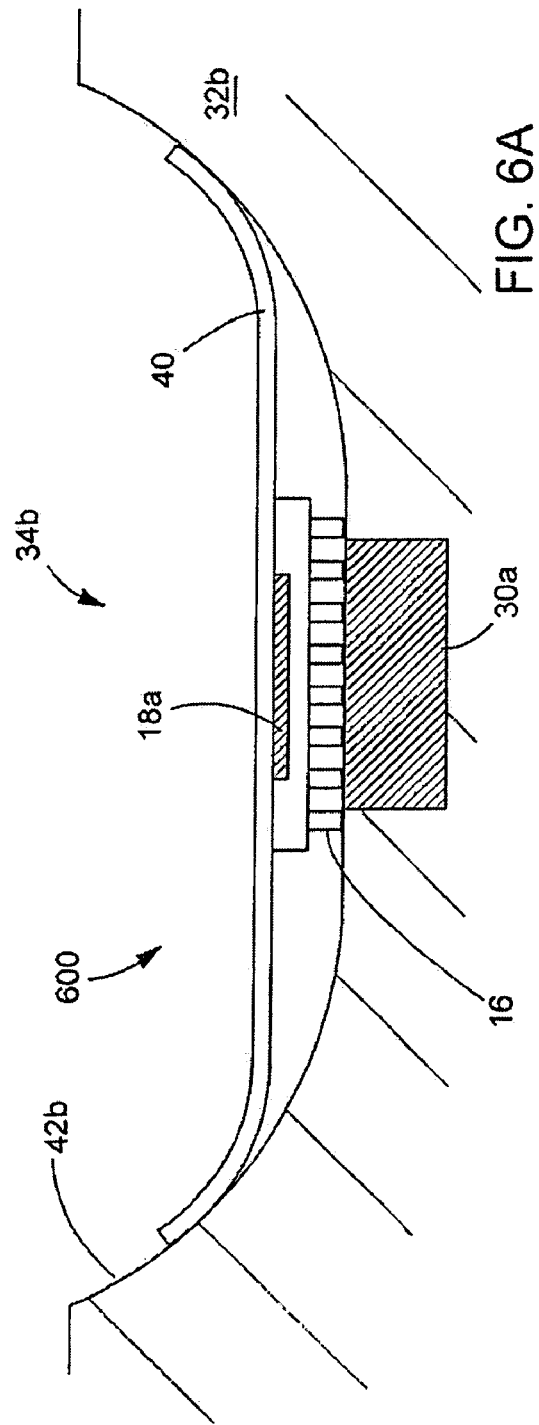

TOUCH FASTENER PRODUCTS

CROSS-REFERENCE TO RELATED APPLICATIONS

This application claims priority to U.S. Provisional Application Ser. No. 60/829,822 filed Oct. 17, 2006.

TECHNICAL FIELD

This invention relates to touch fastener products, and particularly to the use of touch fastener products as mold inserts, such as in the molding of seat foam buns and the like.

BACKGROUND

Seats for cars and light trucks have been formed by molding a foam bun that will serve as the seat cushion, and then attaching a pre-stitched fabric cover to the foam bun. Often, the fabric cover is attached to the foam bun by insert molding touch fastener products into the outer surface of the foam bun and attaching cooperating touch fastener products to an inner surface of the fabric cover. Generally, the fastener products are attached to the fabric cover along the seams where the cover is stitched together and held in place by the seam stitching. The touch fastener products allow the seat manufacturer to rapidly and semi-permanently attach the fabric cover to the foam bun by pulling the fabric cover over the foam bun and pressing the opposed touch fastener products on the foam bun and fabric cover together.

In general, the touch fastener products can be secured to the seat foam bun during a molding process, such as by holding the fastener products magnetically against a side of the mold cavity in which the foam bun is molded. During this molding process, care must be taken to avoid fouling of the fastener elements with the liquid foamable composition used to form the seat. Fouling can occur if the liquid foaming composition leaks between the edges of the base of the touch fastener product and the mold surface into the, space between the fastener elements (e.g., hooks).

SUMMARY

In one aspect, the invention features a touch fastener product for use as a mold insert. The product includes a base having upper faces and lower faces and a central portion disposed between lateral selvedges, the central portion having a nominal thickness, a magnetically attractable material secured to an upper face of the base; and a plurality of fastener elements extending in an array from the lower face of the central portion of the base, wherein the selvedges are of a significantly lesser stiffness than the stiffness of the central portion of the base, for flexure of the selvedges to conform to a mold surface as the base of the fastener product is drawn against the mold surface by magnetic attraction of the magnetically attractable material.

In some embodiments, the touch fastener is formed of a single contiguous resin.

In some embodiments, the central portion includes a strip of a first material supporting the fastener elements, and the selvedges are formed of a second material of different composition than the first material. For example, the strip of first material can have a surface integrally formed with stems of the fastener elements, or the selvedges can include regions of a film secured to the upper face of the base. The film can be secured by an adhesive such as a polyamide hot melt. The film can have one or more of the following properties: the film can be a polyamide film, the film can have a softening point of between about 120 and 220 degrees Fahrenheit (48.88 and 104.44 degrees Celsius), the film can have a nominal thickness of less than about 0.020 inch (0.508 mm), for example about 0.010 inches (0.254 mm) or less, or about 0.005 inches (0.127 mm) or less, and the film can have a flexural rigidity of between about 1500 and 2000 mg-cm, e.g., about 1800 mg-cm.

In some embodiments, the nominal thickness of the central portion of the base is between about 0.002 (0.051 mm) and 0.012 inch (0.305 mm).

In some embodiments, the nominal thickness of the central portion of the base is greater than a nominal thickness of the selvedges.

In some embodiments, the magnetically attractable material includes a metal wire, a metal strip, or a coating of magnetically attractable particles.

In some embodiments, the magnetically attractable material is a composite strand of resin and magnetically attractable particles. In some embodiments, the composite is formed around a core, such as, thread, string, wire or other filament. In some embodiments the magnetically attractable particles are embedded in the resin strand and in other embodiments, the magnetically attractable particles are coated onto the resin strand.

In some embodiments, the composite strand is constructed and arranged so as to be frangible during recycling of the seat bun. In a preferred embodiment, the frangible composite strand is constructed and arranged with sections of reduced cross-section so as to be readily rent or sectioned with the seat bun during recycling.

In some embodiments, the magnetically attractable material is encapsulated in a hot melt adhesive.

In some embodiments, each selvedge extends from the array at least about 2 millimeters, for example each selvedge extends from the array at least about 4 millimeters.

In some embodiments, the selvedges are of a material having a flexural rigidity of between about 1000 and 3000 mg-cm, e.g., about 1500 and 2000 mg-cm, preferably about 1800 mg-cm.

In some embodiments, selvedges are disposed, on all sides of the central portion of the base.

In some embodiments, the central portion of the base includes a molded resin.

In some embodiments, the fastener elements, are male fastener elements. In some cases, the male fastener elements include stems integrally molded with the central portion of the base, the central portion of the base including a molded resin. In some cases, the male fastener elements have loop-engagable heads molded at distal ends of the stems. In some cases, the male fastener elements are hook-shaped.

In some embodiments, the fastener elements are arranged in a density of at least about 100 per square inch (per 645 square mm) across the array.

In some embodiments, the fastener elements have an overall height, as measured normal to the base, of less than about 0.050 inch (1.27 mm).

In another aspect, the invention features a method of forming a seat foam bun. The method includes providing a mold cavity having a shape corresponding to the shape of the seat foam bun, wherein the mold cavity includes a tapered trench having angled side walls, providing a touch fastener including a base, a plurality of fastener elements extending from a lower face of a central portion of the base in an array disposed between lateral selvedges of the base, positioning the touch fastener along the trench with the selvedges deflected from their unloaded position to extend along the trench side walls in face-to-face contact, and delivering a foamable resin into the mold cavity to form a seat foam bun, the deflected selvedges resisting intrusion of foamable resin into the array of fastener elements.

In some embodiments, a lower face of the selvedges has a substantially flat surface.

In some embodiments, the selvedges are of a significantly lesser stiffness than a stiffness of the central portion of the base.

In some embodiments, the trench has flat side walls extending at acute angles from a bottom surface of the trench.

In some embodiments, the trench has curved side walls, the selvedges conforming to arcuate surfaces of the trench side walls.

In some embodiments, in an unloaded condition, the selvedges and central portion of the base lie in a common plane, the distal edges of the selvedges deflected out of the common plane with the fastener positioned along the trench.

In some embodiments, the distal edges of the selvedges contact the trench side walls with the fastener positioned along the trench.

In some embodiments, the selvedges are disposed around all sides of the central portion of the base.

In some embodiments, the central portion of the base has a nominal thickness of between about 0.002 (0.051 mm) and 0.012 inch (0.305 mm)

In some embodiments, the central portion of the base is thicker than the selvedges.

In some embodiments, the touch fastener includes a magnetically attractable material. In some cases, the magnetically attractable material is disposed on the upper face of the central portion of the base. In some cases, the selvedges are substantially free of magnetically attractable material. In some instances, the trench overlays a magnet.

In some embodiments, the trench is elongated, and the fastener product is in strip form. In some embodiments, the trench is a circular plateau and the fastener product is in circular form.

In some embodiments, the fastener elements are male fastener elements having stems integrally molded with a surface of the central portion of the base.

In some embodiments, the foamable resin comprises a polyurethane resin.

In another aspect, the invention features a seat foam bun. The seat foam bun includes a plateau disposed on a surface thereof, and positioned on the plateau is a touch fastener including a base and a plurality of fastener elements extending from a central portion of the base in an array disposed between selvedges of the base, wherein the selvedges are embedded in the foam and extend about opposite upper side edges of the plateau.

In some embodiments, the selvedges are lateral selvedges.

In some embodiments, the plateau is an elongated plateau. In some embodiments, the plateau is a circular plateau.

In some embodiments, the selvedges have a stiffness that is substantially less than a stiffness of the central portion of the base.

In some embodiments, the central portion of the base includes a resin.

In some embodiments, the selvedges include a film.

In some embodiments, the film is adhered to the central portion of the base.

In some embodiments, the central portion of the base is thicker than the selvedges.

In some embodiments, the selvedges extend laterally beyond the central portion at least about 2 mm.

In some embodiments, the touch fastener includes a magnetically attractable material.

In some embodiments, a magnetically attractable material is disposed on the central portion of the base.

In some embodiments, an exposed surface of the selvedges is substantially smooth.

In some embodiments, the foam is a polyurethane foam.

In another aspect, the invention features a method of forming a seat foam bun. The method includes providing a mold cavity having a shape corresponding to a desired shape of the foam bun, positioning a touch fastener in the mold cavity, the touch fastener including a sheet-form base having an upper face and a lower face, a plurality of fastener elements disposed on the lower face of the sheet-form base, and a thermally-activatable resin exposed on the upper face of the sheet-form base; and delivering a foamable resin into the mold cavity causing the resin to foam in an exothermic reaction, wherein the reaction generates sufficient heat to activate at least an outer surface of the activatable resin to adhere the touch fastener to the foam.

In some embodiments, the foamable resin includes a polyurethane.

In some embodiments, the activatable resin comprises a film, for example a polyamide film.

In some embodiments, the resin is disposed over substantially the entire upper face of the base.

In some embodiments, the touch fastener includes a magnetically attractable materially disposed on the upper face of the base.

In some embodiments, the magnetically attractable material is a metal wire laterally centered over the fastener elements.

In some embodiments, the touch fastener includes a material disposed on the lower face of the base, the material surrounding the plurality of fastener elements and forming a gasket between the base and a surface of the mold cavity.

In some embodiments, the touch fastener includes selvedges extending laterally beyond the plurality of fastener elements.

In some embodiments, the selvedges extend longitudinally beyond the plurality of fastener elements.

In some embodiments, the selvedges are integrally molded with the base.

In some embodiments, the selvedges include a film disposed on the upper surface of the base.

In some embodiments, the selvedges include a smooth surface that engages a mold surface in face-to-face contact.

In another aspect, the invention features a touch fastener for use as a mold insert in which a molded surface can be formed. The touch fastener includes a sheet-form base including an upper face and a lower face, a plurality of fastener elements extending from the lower face of the sheet-form base disposed in an array, and a magnetically attractable material secured to the sheet-form base, wherein a portion of the sheet-form base extends laterally beyond the array of male fastener elements and forms selvedges on opposite edges of the sheet-form base, the selvedges being free of the magnetically attractable material, and having smooth, planar lower faces for engaging a flat mold surface in face-to-face contact on either side of the array to form a seal on either side of the array.

In some embodiments, the fastener elements are male fastener elements having stems integrally molded to the lower face of the sheet-form base.

In some embodiments, the magnetically attractable material includes a metal wire.

In some embodiments, each selvedge extends from the array at least about 2 mm.

In some embodiments, the width of the array of fastener elements is between about 2 mm and 10 mm.

In some embodiments, the length of the touch fastener is at least about 200 mm.

In some embodiments, the touch fastener also includes a material disposed on the upper face of the sheet-form base.

In another aspect, the method features a method of forming a seat form bun, including the following steps: providing a mold cavity having a shape corresponding to a desired shape of the foam bun and defining a trench overlying a magnet, providing a touch fastener mold insert, the insert including a sheet-form base including an upper face and a lower face, a plurality of fastener elements extending from the lower face of the sheet-form base disposed in an array; and a magnetically attractable material secured to the sheet-form base, a portion of the sheet-form base extending laterally beyond the array of male fastener elements and forming selvedges on opposite edges of the sheet-form base, the selvedges having smooth, planar lower faces, positioning the insert in the trench to establish a magnetic attraction between the attractable material and the magnet, thereby creating area contact pressure between the smooth, lower faces of the selvedges and mold surfaces on either side of the trench to form a seal; and delivering a foamable resin into the mold cavity to form a seat bun.

In some embodiments, the fastener elements are male fastener elements having stems integrally molded to the lower face of the sheet-form base.

In some embodiments, the foam is a polyurethane foam.

In some embodiments, the magnetically attractable material is encapsulated in a polyamide hot melt composition.

In some embodiments, the magnetically attractable material includes a metal wire.

In some embodiments, the magnetically attractable material extends over substantially the entire length of the touch fastener and is substantially centered over a width of the touch fastener.

In some embodiments, the magnetically attractable material includes a coating of metal particles.

In some embodiments, the coating of metal particles is substantially centered over a width of the touch fastener.

In some embodiments, each selvedge extends from the array at least about 2 mm, for example, each selvedge can extend from the array at least about 4 mm.

In some embodiments, the width of the array of fastener elements is between about 2 mm and 10 mm.

In some embodiments, the length of the touch fastener is at least about 200 mm.

In some embodiments, sheet-form base is between about 0.002 (0.051 mm) and 0.012 inch (0.305 mm) thick.

In some embodiments, the method also includes a touch fastener having a material disposed on the upper face of the sheet-form base.

In some embodiments, the material is a woven material.

In some embodiments, the male fastener elements include molded hooks or mushroom shapes.

In one aspect, the invention features a touch fastener having a sheet-form base comprising an upper face and a lower face, a plurality of fastener elements disposed in an array on the lower face of the sheet-form base, a magnetically attractable material disposed on the upper face of the sheet-form base; and a cover covering the magnetically attractable material and disposed onto the upper face of the base, wherein maximum slope angle of the cover, when positioned onto the upper face of the base and covering the magnetically attractable material, has a maximum slope angle of less than about 75° (e.g., less than about 70°, less than about 65°, less than about 60° less than about 55°, less than about 50°, or less than about 45°), as measured from the upper surface of the sheet form base to the outside surface of the cover, as measured from the upper surface of the sheet form base to the outside surface of the cover.

In some embodiments, the film is between about 0.002 (0.051 mm) and 0.012 inch (0.305 mm) thick. In some embodiments, the film is disposed over substantially the entire upper face of the base.

In some embodiments, the cover is a fabric such as a woven or a non-woven fabric.

In some embodiments, the touch fastener also includes a material secured to the lower-face of the base, wherein the material surrounds at least a portion of the array of fastener elements.

In some embodiments, the magnetically attractable material is a metal wire, a coating of metal particles, or a magnetically attractable component comprising a plurality of magnetically attractable particles that are compressed together to form a composite material (e.g., substantially circular, ovular, or rectangular in cross-section). The magnetically attractable material can be, for example, disposed in a strip extending substantially an entire length of the touch fastener and substantially centered in a width of the touch fastener.

In some embodiments, the touch fastener also includes selvedges extending laterally beyond the array of fastener elements, wherein the selvedges comprise a substantially flat surface configured to engage a flat surface of a mold in face-to-face contact. The selvedges can be, for example, integrally molded with the base, formed of a material such as a film or a woven or non-woven fabric disposed on the upper surface of the base, or the selvedges can be formed from an extension of the cover, extending laterally beyond the array of fastener elements.

In some, embodiments, the selvedges extend across the upper face of the sheet-form base and form a cover covering the magnetically attractable material disposed on the upper face of the base. The cover covering the magnetically attractable material, has a maximum slope angle of less than about 75° (e.g., less than about 70°, less than about 65°, less than about 60° less than about 55°, less than about 50°, or less than about 45°), as measured from the upper surface of the sheet form base to the outside surface of the cover, as measured from the upper surface of the sheet form base to the outside surface of the cover.

The selvedges can be, for example, integrally molded with the base, formed of a pliable material such as a film or a woven or non-woven fabric disposed on the upper surface of the base, or the selvedges can be formed from an extension of the cover, extending laterally beyond the array of fastener elements.

The touch fasteners described herein can be used in a molding process, for example, to form a seat foam bun.

Seat foam buns including a touch fastener described herein are also described.

The term "stiffness" as used herein refers to the resistance of a sheet-form material to bend out of its plane when subjected to a normal bending force, and is synonymous with flexural rigidity.

At least some of the touch fasteners described herein can be used in molding processes without requiring a gasket to protect the fastener elements from being fouled with foam used to form a the touch fastener (for example to form a gasket), thus reducing manufacturing costs. This can eliminate an additional manufacturing step of securing a separate material.

In some aspects, the touch fastener products, when used in a molding process, can reduce the hindrance of the flow of foamable resin during the forming of a seat foam bun. For example, by having selvedges that lie flat in face-to-face contact with a mold surface, the selvedges create only a minor ridge. Accordingly, the foamable resin can pass over the touch fastener without creating a significant disturbance in the flow of the resin (for example, as can occur when the advancing foamable resin meets an impediment), which can result in undesirable variations in foam density.

By molding a touch fastener into a plateau portion of a seat form bun, with selvedges of the fastener extending over the edges of the plateau, the touch fastener can have improved adhesion to the seat form bun and be more resistant to tearing. The improved adhesion can result from conversion of at least some normal fastener separation load into a shear force between the angled selvedges and the foam.

In instances where the selvedges are formed of a material more flexible than the central portion of the touch fastener, the stress at the edges of the touch fasteners may be reduced. For example, in some instances the selvedges can bend more easily to maintain contact with the surface of the seat foam bun in instances where the seat foam bun is subjected to a compressing stress.

By providing a touch fastener with a back surface of a resin having a softening point near or lower than the reaction temperature during bun molding, the touch fastener can have improved adhesion to the seat form bun through heat activation of the exposed resin from the exothermic foaming reaction.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a cross-sectional view of the touch fastener of FIG. 5 positioned in a trench of a mold cavity.

FIG. 6A is a cross-sectional view of another touch fastener positioned in a tapered trench.

FIG. 10 is an enlarged view of area 10 of FIG. 9.

The figures depicted herein are intended to aid the reader's understanding of various features of the invention disclosed herein. Accordingly, the drawings are for illustration only and are not necessarily drawn to scale. Like reference symbols in the various drawings indicate like elements.

DETAILED DESCRIPTION

Figure 1:
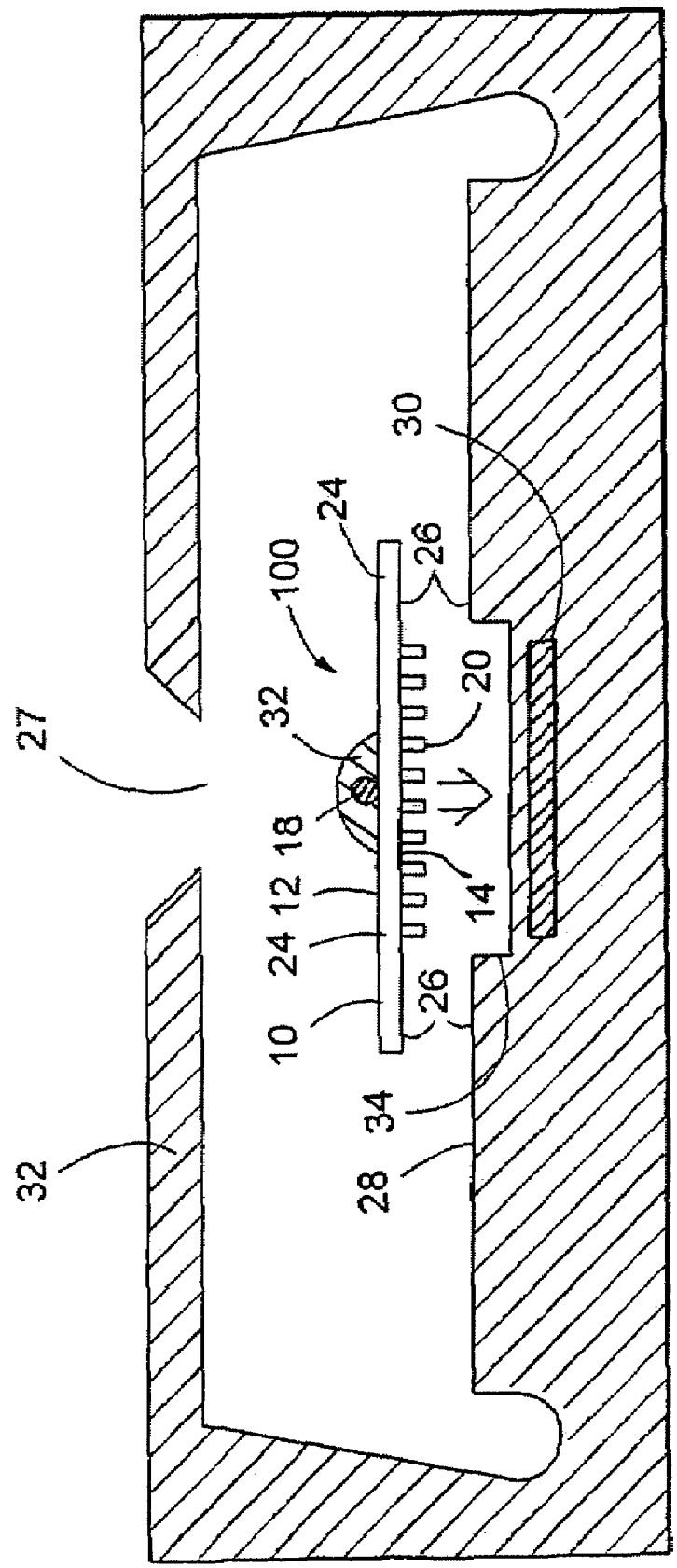
FIG. 1 is a cross-sectional view of a touch fastener being positioned in a mold cavity.

In one aspect, the invention features a touch fastener 100 for use as a mold insert. Referring to FIG. 1, touch fastener 100 includes a sheet-form base 10 having an upper face 12 and a lower face 14. Fastener elements 16 extend from the lower face 14 of sheet-form base 10 in an array 20. A metal wire 18 is adhered with an adhesive 22 to the upper face 12 of sheet-form base 10. Selvedges 24 extend laterally from the sheet-form base 10 beyond either side of the array 20. Lower faces 26 of selvedges 24 are smooth, planar surfaces, which can engage a flat mold surface 28 in face-to-face contact.

In some instances, as depicted in FIG. 1, a magnet 30 can be positioned in a mold 32 to position touch fastener 100 in a trench portion 34 of the flat mold surface 28. With the fastener so positioned, a foamable liquid resin is poured into the mold cavity 27. An exothermic reaction occurs, causing the liquid resin to foam up to fill the cavity. The foam adheres or is otherwise secured to the fastener, which becomes a part of the surface of the foam bun removed from the cavity.

Figure 2:
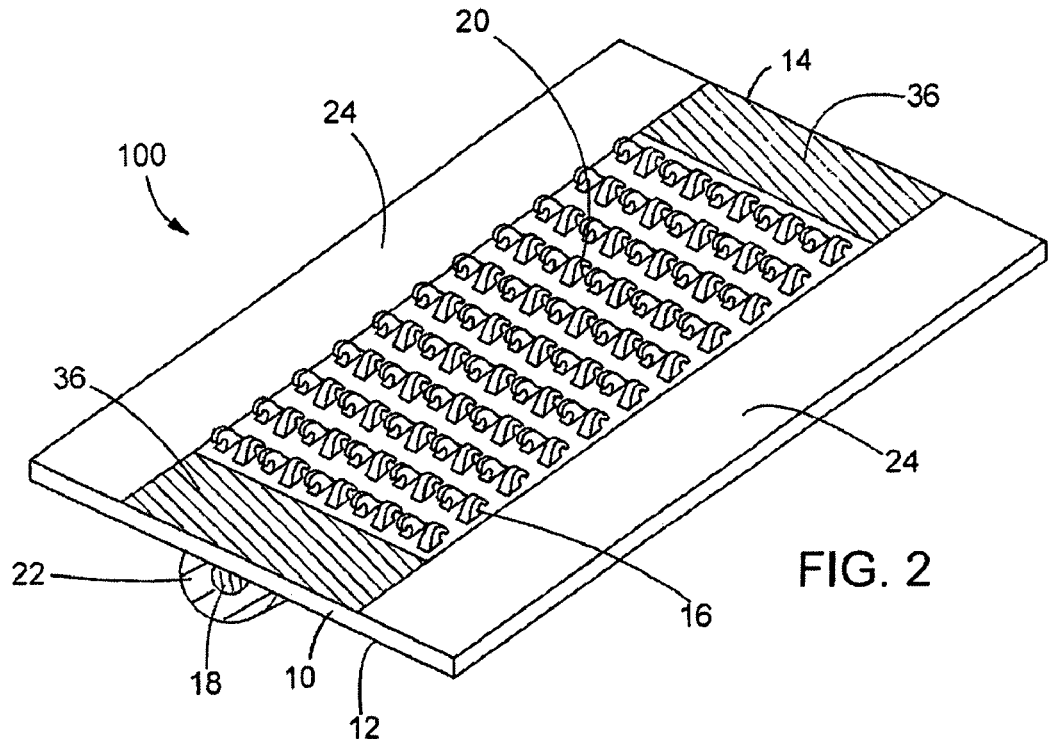
FIG. 2 is a perspective view of a touch fastener having selvedges.

FIG. 2 is a perspective view of touch fastener 100. Smooth, planar selvedges 24 extend laterally beyond array 20 of male fastener elements 16. Methods of forming molded touch fasteners having stems or fastener elements extending integrally therefrom are well known in the art. For example, a continuous extrusion/roll-forming method for molding fastener elements on an integral, sheet-form base is described in detail in U.S. Pat. No. 4,794,028 and in U.S. Pat. No. 4,775,310, the entire disclosures of which are incorporated herein by reference.

In some instances, the touch fastener product can be laminated to a mesh or scrim material. The scrim material can provide-improved dimensional stability. Moreover, the scrim material can be magnetic (e.g., a ferrous-impregnated non-woven material), thus providing a magnetically attractable material as discussed above. Suitable examples of laminates are described in U.S. Pat. No. 5,518,795 to Kennely et al. entitled LAMINATED HOOK FASTENER, the entire disclosure of which is incorporated herein by reference.

After a continuous length of touch fastener 100 is formed, it is cut to a defined length and then male fastener elements 16 are removed from opposite longitudinal ends of array 20 to provide flat portions 36 of the lower face 14 of sheet-form base 10. Alternatively, the fastener elements may be formed to be of such small size that they need not be removed from the longitudinal ends to effect sealing against foam intrusion across the fastener element array. A metal wire 18 is centered laterally over the array 20 of male fastener elements 16, and adhered to the upper face 12 of sheet-form base 10 with an adhesive 22, either before or after the base is cut to length.

In general, the array of touch fasteners is an array of hooks having a length of about 200 mm and a width of about 4 mm. The selvedges each generally have widths of about 4 mm. The flat portions of the lower face of the sheet form base extend longitudinally beyond the fastener array about 4 mm. The sheet form base is constructed from a resin, such as a polyester, polypropylene, nylon, or other, and has a nominal thickness of about between about 0.002 (0.051 mm) and 0.020 inch (0.51 mm), for example 0.005 inch (0.127 mm).

Figure 3:
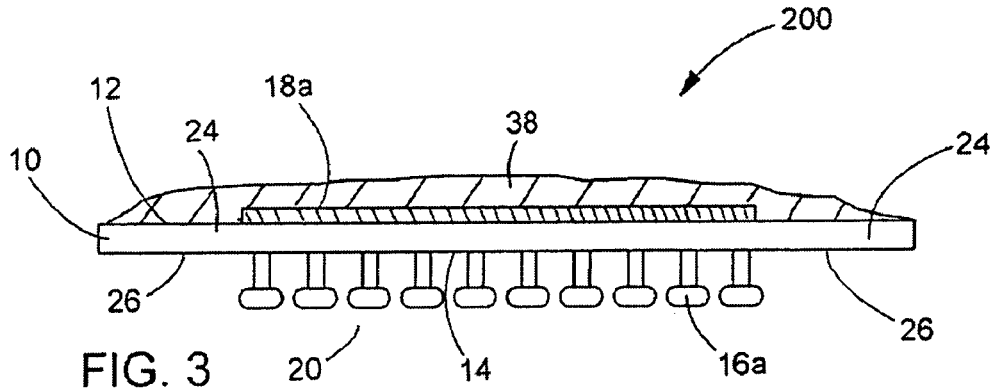
FIG. 3 is a cross-sectional view of a touch fastener having a material adhered thereto.

An alternate embodiment of a touch fastener for use as a mold insert is depicted in FIG. 3. Touch fastener 200 includes a sheet-form base 10 having an upper face 12 and a lower face 14. A strip of magnetically attractable material 18a, such as iron, for example an iron wire, iron particles, steel, etc., is secured to the upper face 14 of the sheet-form base 12. Positioned over the magnetically attractable material 18a and secured on the upper face 12 of the sheet-form base 10, for example with an adhesive, is material 38, such as a woven or a non-woven material, or a knit of fiber, for example a cardboard or paper material. Alternatively, material 38 may be laminated directly to the molten resin of base 10 as the fastener element stems are molded, thereby encapsulating material 18a, using a combination of techniques taught by Kennedy et al (cited above) and Kenney et al. (U.S. Pat. No. 5,945,193), the entire contents of which are hereby incorporated by reference. In some instances, material 38 provides improved adhesion of touch fastener 200 to a seat foam bun. Male fastener elements 16a are molded integrally with and extend from the lower face 14 of the sheet-form base 10 in an array 20. Selvedges 24 having smooth, planar lower faces 26 extend laterally beyond the array 20 of male fastener elements 16 and can engage in face-to-face contact with a flat mold surface.

Figure 4:
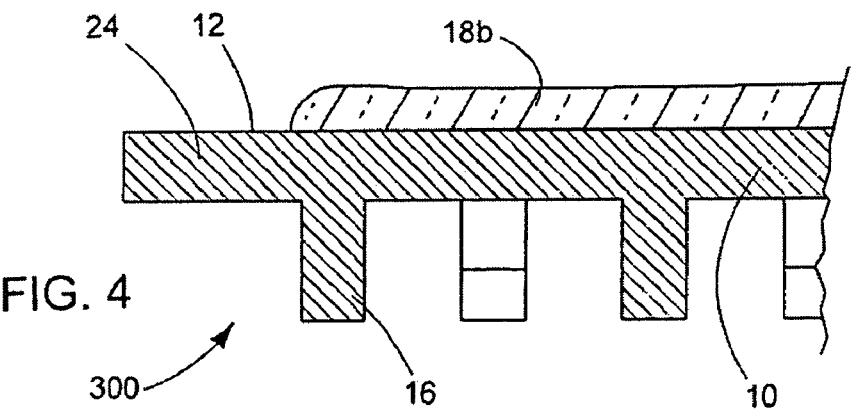
FIG. 4 is a cross-sectional view of a touch fastener having a coating of magnetically attractable material secured thereto.

In some instances, as depicted in FIG. 4, a touch fastener 300 can have adhered to an upper face 12 of a sheet-form base 10 a coating of magnetically attractable material 18b. In the configuration shown, selvedges 24 are substantially free of magnetically attractable material. In some other examples, the coating extends over the selvedges.

Figure 5:
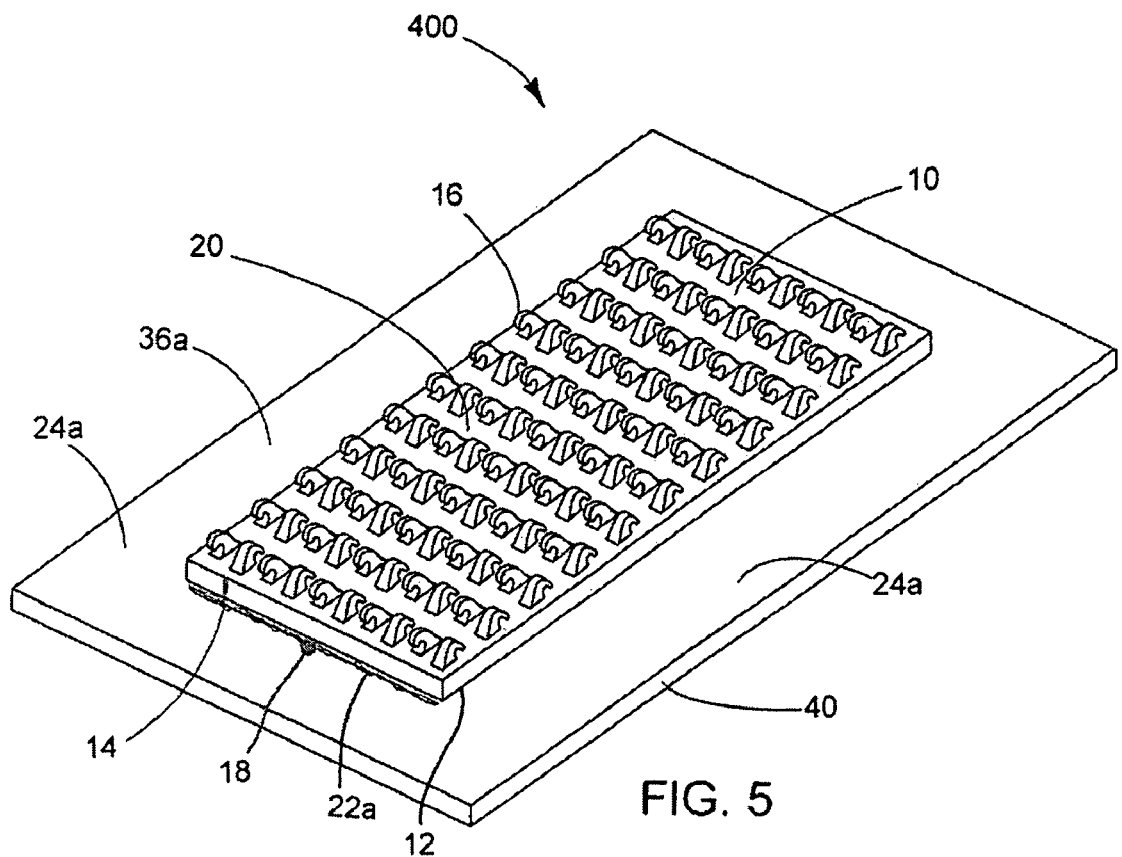
FIG. 5 is a perspective view of a touch fastener having selvedges of a film material.

Referring to FIG. 5, touch fastener 400 includes a base portion 10 having an upper face 12 and a lower face 14. Male fastener elements 16, such as hooks, extend from the lower face 14 of the base 10 in an array 20. A magnetically attractable wire 18 is secured to the upper face 12 of the base 10 with an adhesive 22a. A film 40 is adhered to the upper face 12 of the base 10 by adhesive 22a and extends laterally beyond the base 10 to form selvedges 24a. The selvedges 24a have a stiffness that readily allows for flexure out of the plane of touch fastener 400, for example, under force of magnetic attraction. As shown in FIG. 5 the film extends longitudinally beyond the sheet form base, forming flat portions 36a that can engage a mold surface in face-to-face contact.

The base 10 has a length of about 200 mm and a width of about 4 mm. The sheet form base is constructed from a resin, such as polyester, polypropylene, or nylon, and has a nominal thickness of about 0.010 inch (0.254 mm). The array of fastener elements 20 extends over substantially the entire lower face 14 of the base 10. The film extends about 4 mm laterally beyond the base 10 and about 4 mm longitudinally beyond the base 10. The film is a polyamide film and has a nominal thickness of 0.005 inch (0.127 mm). The fastener elements 16 are hooks positioned in alternating rows of hooks facing in opposing directions. Although a polyamide film is described in the present embodiment, other films could also be used, including polyurethane or other adhesive films.

FIG. 6 depicts a cross-sectional view of touch fastener 400 positioned in a mold 32a. A magnet 30a is positioned below a trench 34a portion of the mold, where the trench 34a has angled side portions 42. The force of magnetic attraction between magnet 30a and metal wire 18 holds touch fastener 400 in position against the surface of the mold trench 34a during foaming. During the molding process, selvedges 24a engage mold surface 28a in face-to-face contact to prevent fouling of fastener elements 16. Contact pressure between the selvedges and the mold wall is a function of the magnetic force applied to the wire 18, and the bending stiffness of the film 40.

FIG. 6A shows another example of a tapered trench, this one having arcuate side walls that extend upward from the bottom of the trench. The film 40 is of such a width that lateral selvedges of the film are deflected upward as the central portion of the fastener is drawn against the bottom of the trench. The illustrated fastener 600 includes a thin strip of magnetically attractable metal 18a, instead of a wire, disposed within the central portion of the strip-form product. Metal 18a may be in the form of a shim, for example, and may be perforated, and expanded to form holes through its thickness for improved resin adhesion. Strip 18a may be bonded to resin of base 10a as the base is formed, or adhered thereto by adhesive, such as adhesive binding film 40 to base 10a.

Figure 7:
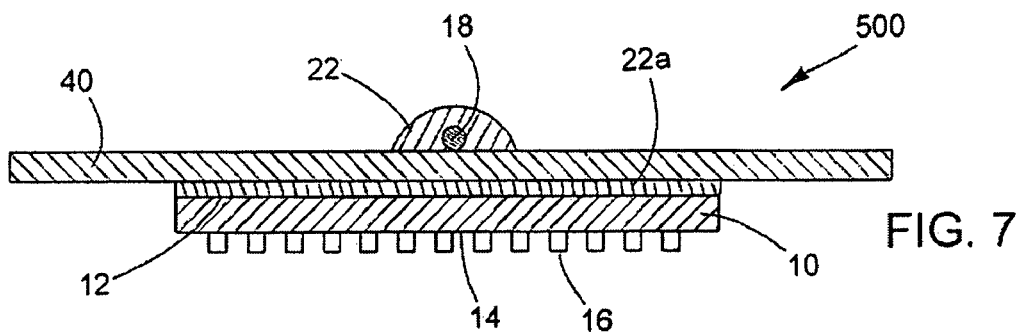

The touch fastener 500 of FIG. 7 is identical in structure to the one shown in FIG. 5, except that wire 18 is disposed on an opposite side of film 40, and held in place by a discrete bead of hot melt polyamide 22. Film 40 may be bonded to base 10 with adhesive 22a as shown, or directly laminated to the resin of the hook base.

Figure 8:
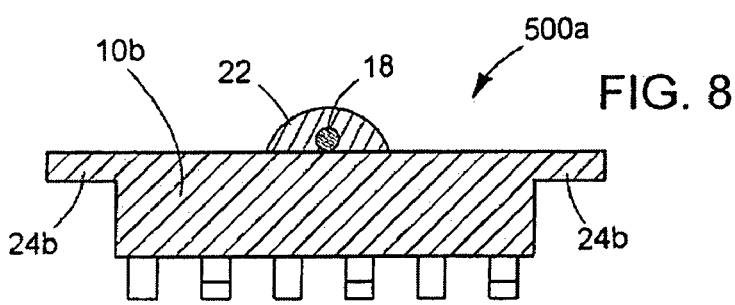
FIGS. 7 and 8 are cross-sectional views of alternate touch fastener constructions.

The touch fastener of 500a of FIG. 8 is similar in structure to the touch fasteners of FIGS. 5 and 7, except that touch fastener 500a is a single, unitary structure constructed of a resin material. The base portion 10b is integrally molded with selvedges 24b such that the nominal thickness of the base portion is greater than the nominal thickness of the selvedges. Like touch fastener 500, the wire 18 is adhered to the upper face of base 10b with adhesive 22.

Figure 9:
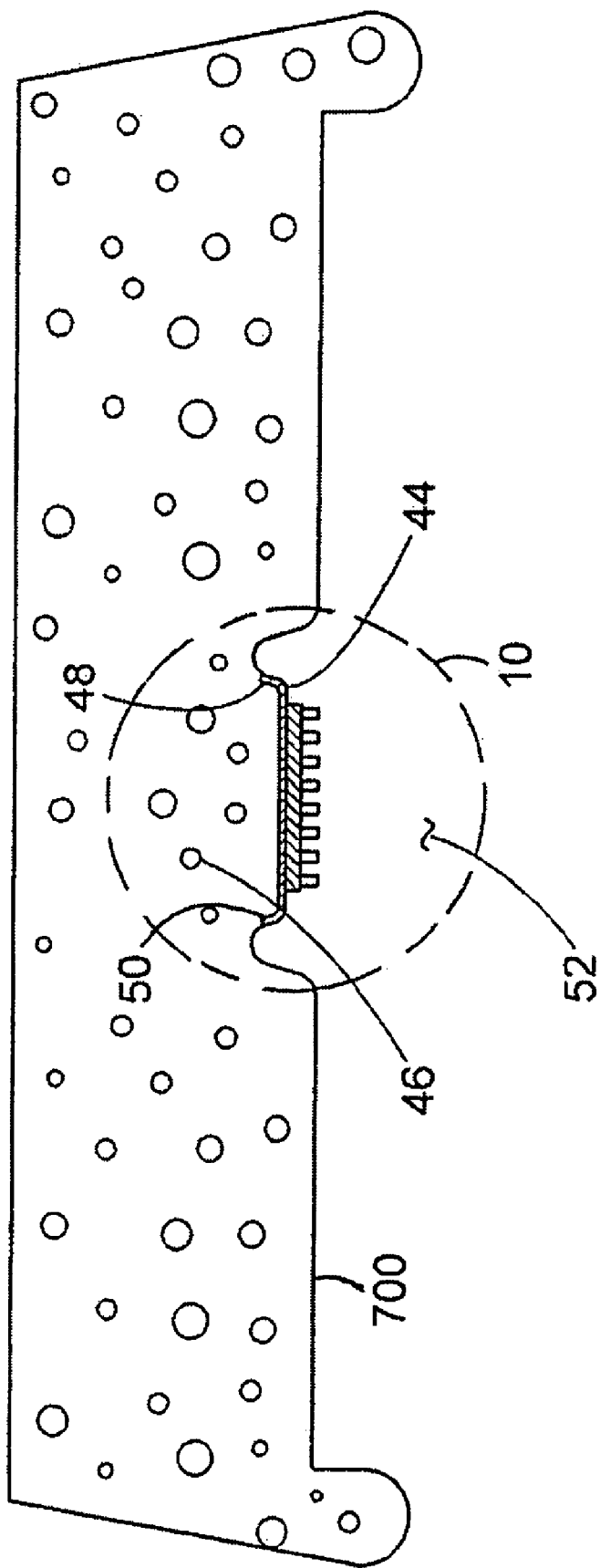
FIG. 9 is a cross-sectional view of a seat foam bun.

In some instances, the touch fasteners are molded into a seat foam bun, for example as depicted in FIGS. 9 and 10. Molded seat foam bun 700, depicted in FIG. 9, includes a trench portion 44, which includes a plateau 46 having lateral edges 48 and angled side walls 50. A touch fastener 52 is molded into plateau 46 and extends across lateral edges 48 and along a portion of angled sides 50, such that the distal edges 51 of the fastener are disposed out of the plane of the fastener element array, and directed down into the bun. Touch fastener 52 includes a base 10 portion having an upper face 12 and a lower face 14. Extending from the lower face 14 are male fastener elements 16 having stems integrally molded thereto. A magnetically attractable-strip 18a is adhered to the upper face 12 of the base 10 and a film 40 covers magnetically attractable strip 18a and expands beyond the lateral edges of the base 10 to form selvedges 24a. The selvedges 24a are molded into the seat foam bun 700, creating a smooth surface on the lateral edges 48 and angled side 50 walls of the plateau 46.

In general, the extension of selvedges 24a down side walls 50 can provide strong adherence between touch fastener 52 and seat foam bun 700 and improved resistance to delamination. For example, when upward force "F" is applied to touch fastener 52, at least a portion of that upward force is resisted by a shear force "S" between angled selvedges 24a underlying foam and helping to prevent cracks from forming between touch fastener 52 and seat foam bun 700, which can lead to dislocation of touch fastener 52.

For use in a tapered trench as shown in FIG. 6 or 6A, the selvedges 24a of the fastener product preferably are of a bending stiffness or flexural rigidity sufficiently low to enable the selvedges to be deflected into face-to-face contact with the side walls of the trench, and to allow the attractable magnetic forces to pull the central portion of the fastener product into planar contact with the bottom of the trench across the entire hook array. However, the selvedge-bending stiffness should also be high enough to maintain a contact pressure between the selvedges and mold surface, preferably even along the lateral edges of the selvedges during the foaming process. For many applications employing typical mold magnets and reasonable trench widths, a selvedge material having a flexural rigidity of between about 1000 and 3000 gm-cm, as measured in accordance with the Cantilever Test option of ASTM D1388, should be suitable.

However, different applications may require varying the selvedge stiffness to optimize results. For example, while film has been described as suitable selvedge material, other materials can also be used to form selvedges, including paper or other fibrous material, rubber, cotton, or horse hair.

Figure 11:
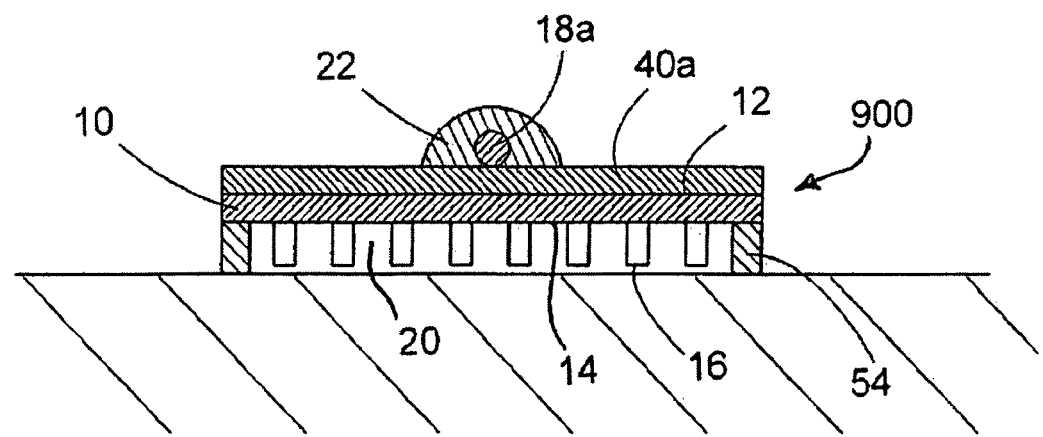
FIG. 11 is a cross-sectional view of a touch fastener having a film adhered to the upper face of the sheet-form base and a magnetically attractive material adhered to the film.

As depicted in FIG. 11, touch fastener 900 includes a sheet-form base 10 with an upper face 12 and a lower face 14. Fastener elements 16 extend in an array 20 from lower face 14 of sheet-form base 10. A film 40a is secured to upper face 12 of sheet-form base 10. A metal wire 18 is secured with an adhesive 22 to film 40a.

FIG. 11 also illustrates a gasket material 54 positioned around the array of fastener elements 16, such that when touch fastener 900 is positioned against a flat mold surface 55, material 54 forms a seal against the mold surface during the foaming process, acting as a barrier to protect fastener elements 16 from foam intrusion. The sealing of the gasket formed between material 54 and the mold surface is aided by a magnetically attractable force between metal wire 18 and a magnet (not shown) positioned below the mold surface.

Figure 12A:
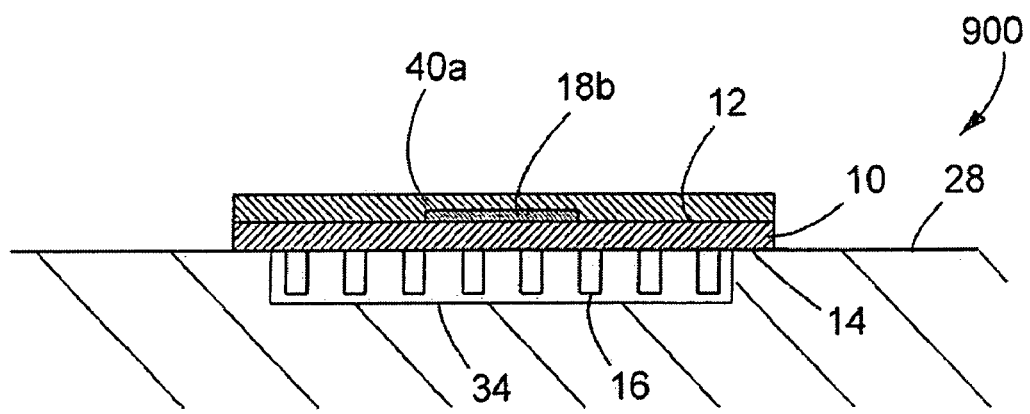
FIGS. 12A and 12B show a cross-sectional views of a touch fastener configured with a magnetically attractive material positioned between the sheet form base and a cover.
Figure 12B:
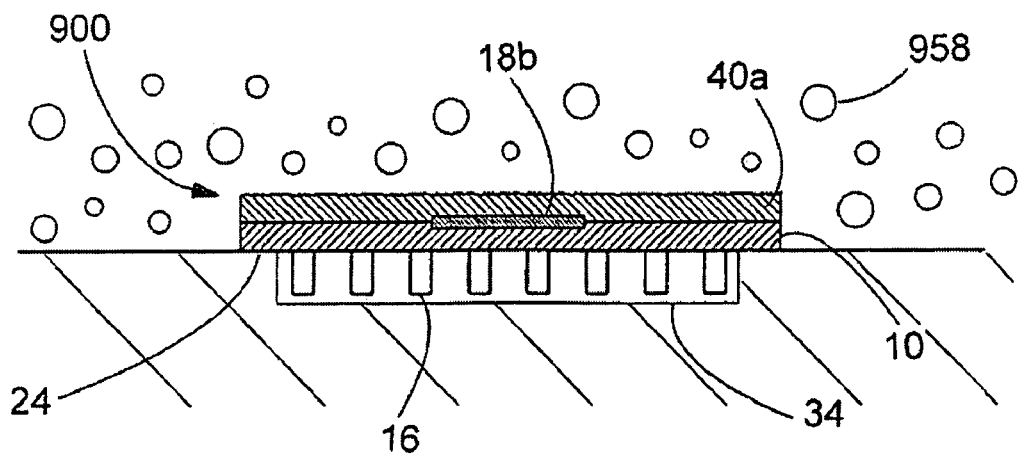

FIG. 12A depicts a fastener 900 with a flat metal wire 18b secured between film 40a and upper face 12 of sheet-form base 10. Fastener 900 is drawn towards trench portion 34 by a magnet (not shown). FIG. 12B depicts fastener 900b drawn against trench portion 34 during injection of foam resin 958 over fastener 900 to form a seat bun.

In some embodiments, it is preferred that wire 18b or other magnetically attractable component be centered along the width of touch fastener 900, extending substantially along the length of touch fastener 900. For example, it is preferred that the magnetically attractable component 18b not extend over the entire width of touch fastener 900, but instead be concentrated into the center portion of touch fastener 900. The concentration of magnetically attractive material in the center of touch fastener 900 can be used to help position touch fastener 900 into the mold. For example, a higher density of magnetically attractive material over a smaller area is generally more effective to draw the touch fastener into a desired position than a lower density of magnetically attractive material over a larger area (e.g., where particulate of magnetically attractive material are positioned over the entire cross-sectional area of the touch fastener, for example, as a component of a film or coating). It is generally preferred that the width or circumference of the magnetically attractive component 18b be less than about 25% of the base 10 (e.g., less than about 20%, less than about 15%, less than about 10%, or less than about 5%). In embodiments where the width of touch fastener, 900 is from about 6 mm to about 12 mm the width or circumference of the magnetically attractive component 18b is generally less than about 3 mm.

Figure 13:
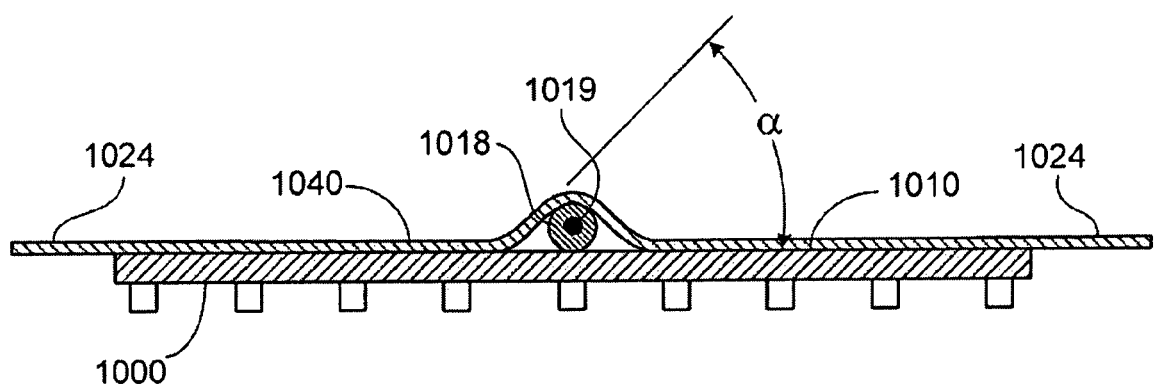
FIG. 13 shows a cross-sectional view of the touch fastener configured with a magnetically attractive material.

FIG. 13 depicts a fastener 1000 having a magnetically attractable material 1018 secured to sheet-form base 1010. Magnetically attractable material 1018 is a composite of resin and magnetically attractable particles formed around a core 1019. Magnetically attractable material 1018 is covered by a cover 1040. Cover 1040 extends laterally beyond sheet-form base 1010 to form lateral selvedges 1024.

In some embodiments, the magnetically attractive material 1018 is formed around a core 1019 such as string, wire, thread or other filament, for example by coating core 1019 with resin and magnetically attractive particles. For example, the magnetically attractive material 1018 is formed by coating core 1019 with an adhesive, such as a glue (e.g., an aqueous solution of a glue), and adhering magnetically attractive particles to the glue. For example, the magnetically attractive particles can be sprinkled onto a glue coated thread, or the glue coated thread can be submerged into magnetically attractive particles. The coated string is then positioned onto touch fastener 1000 (e.g., centered on the touch fastener) and adhered to touch fastener 1000, for example using an adhesive.

In some embodiments, magnetically attractable material 1018 can be formed as a composite of resin and magnetically attractive particles, for example, in an extrusion process, where magnetically attractive particles such as iron filings are co-extruded with a resin to form a frangible strand of composite material. In some preferred embodiments, the extruded material includes at least about 50% by weight of magnetically attractive particles (e.g., at least 55%, at least 60%, at least 65%, at least 70%, at least 75%, at least 80%, at least about 85%, at least about 90%, at least about 95%). Accordingly, magnetically attractable material 1018 may be formed as a wire, strip, chord, composite strand, band, insert, or any other shape of iron containing elements suitable to retain fastener 1000 within a mold trench.

Figure 14A:
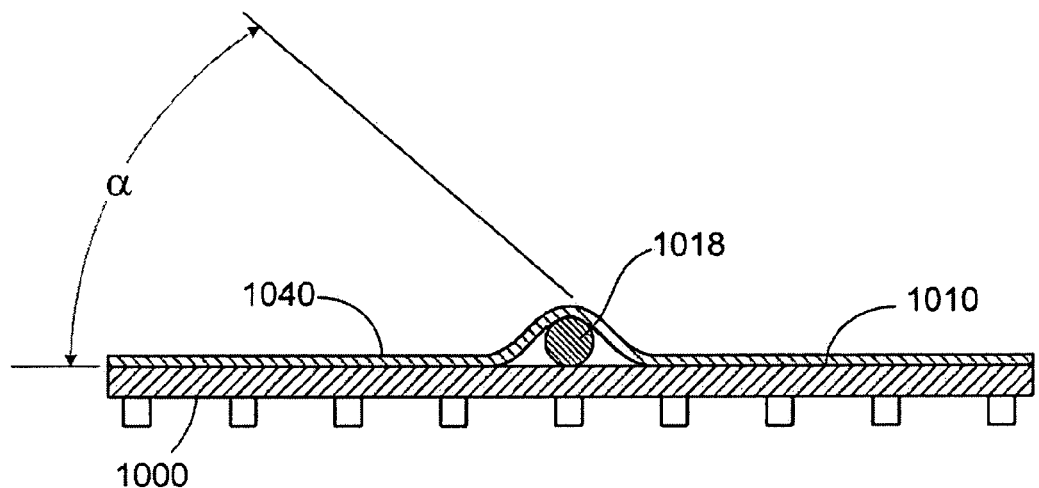
FIGS. 14A and 14B are cross-sectional views of a touch fastener having a cover adhered to the upper face of the sheet-form base and sloping at an angle to the sheet-form base to cover the magnetically attractable material.

FIG. 14A depicts a touch fastener 1000 product having a magnetically attractive material 1018 disposed between the sheet form base 1010 and a cover 1040 (e.g., a film or a fabric cover). It is desirable that the change in height between the flat areas of the film cover 1040 and the raised areas overlying the magnetically attractable material be relatively gradual, avoiding any steep discontinuities that could hinder flow of the foamable resin. Accordingly, the magnetically attractive material 1018 and the cover 1040 are configured to provide a geometry such that the maximum slope angle α of the cover 1040 as it is draped over the magnetically attractable material 1018 is less than about 75° as measured from the upper surface of the sheet form base 1010 to the outside surface of the cover 1040.

In some embodiments, it is desirable that cover 1040 be a film (e.g., a smooth, non-porous film). In some embodiments, the magnetically attractive material 1018 is secured to the sheet form base 1010 using an adhesive, whereas in some embodiments, the magnetically attractable material 1018 is held in place on the face of the touch fastener by the cover 1040 (e.g., the cover 1040 is secured to the sheet form base 1010 thereby securing the magnetically attractive material 1018, which is positioned between the cover 1040 and the sheet form base 1010).

Figure 14B:
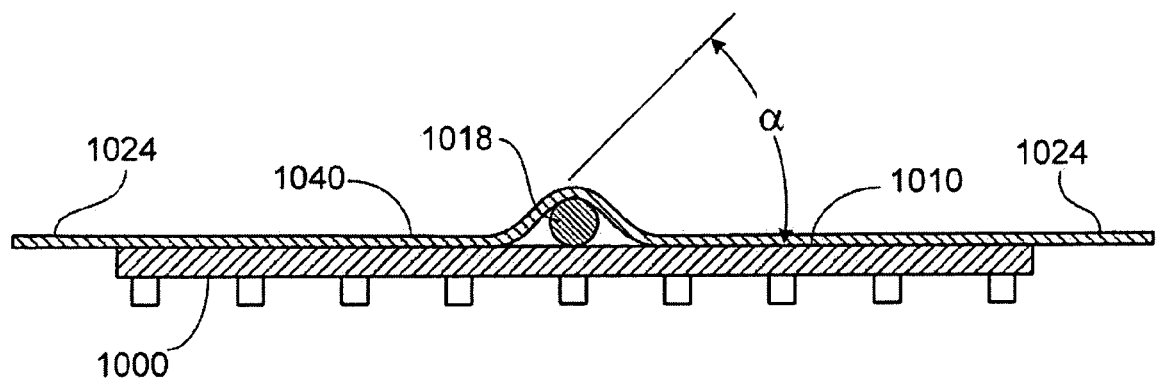

FIG. 14B depicts the touch fastener of FIG. 14A where cover 1040 extends beyond the width of the sheet-form base 1010 to provide selvedges 1024 and 1024. The selvedges are configured to have face-to-face contact-with a mold surface when used in a molding process. Cover 1040 may be a film. Because film is generally of a low thickness, the change in surface where the film selvedges 1024 contact the mold surface is relatively small, minimizing the turbulence or stagnation of the foamable resin as it flows over film selvedge 1024.

When used in a molding process to provide a foam bun, the touch fasteners depicted in FIGS. 14A and 14B provide a geometry that is desirable for reducing the amount of turbulence and stagnation of the foam material as it flows over the surface of touch fastener 1000. For example, as the foam passes over the touch fastener, it is desirable for the slope angle α of the cover to be less than about 70°, thereby providing for a smooth and slow rise over the surface of the touch fastener. This gradual rise allows the foaming resin to maintain more consistent contact with touch fastener 1000 by reducing local stagnation of the foam material as it moves over touch fastener 1000 and foams, thereby reducing the number of larger air pockets against the back surface of touch fastener 1000 and increasing the degree of adherence of the foam bun to the touch fastener product. It is also preferable for the lateral edges of cover 1040 to provide no more than a very small step over, which the foaming resin must flow. For example, films or other cover materials having a thickness of less than about 0.010 inch (0.254 mm) are preferred, if the cover is to be draped against a flat wall surface of the mold. Alternatively, cover 1040 can be recessed in the mold surface by providing a suitable undercut in the mold cavity wall, with the edges of the cover abutting small steps in the wall surface, such that the outer surface of the cover is generally aligned with the mold surface, providing a smooth flow surface for the foaming resin.

In some preferred embodiments, cover 1040 transitions over the, magnetically attractive material 1018 in a smooth or gradual slope, as opposed to an angular transition.

Preferably the back surface of touch fastener 1000 (i.e., the surface against which the foaming resin flows) has no features or obstructions that would locally stagnate the flow of resin, such as by presenting a local flow obstacle.

Examples of suitable thermally activatable resins that can be provided as films or in other forms include polyamides, polyurethanes, and other hot melt adhesives.

Examples of suitable fasteners are included in provisional application Ser. No. 60/829,761, filed Oct. 17, 2006, which is incorporated herein by reference in its entirety.

A number of embodiments of the invention have been described. Nevertheless, it will be understood that various modifications may be made without departing from the spirit and scope of the invention. For example, in some embodiments, the magnetically attractable material 1018 is a magnetically attractive component composed of particulate material (e.g., magnetically attractive particulate material such as iron filings). The magnetically attractive component is generally elongated, for example in the shape of a chord (e.g., having a substantially circular cross-sectional area) or in the shape of a strip or ribbon (e.g., having substantially a rectangular or oval cross-sectional area).

The magnetically attractive component is produced to provide a frangible material that can break or separate with the touch fastener product. A "frangible" composite is one that may be readily segmented or rent during recycling of the seat bun as opposed to continuous solid metal wires which can wind around rotary shredding blades during recycling operations. For example, when a touch fastener is a component in a product such as a seat foam bun and the product is recycled, the touch fastener product is often removed from the seat foam bun. In these instances, it is desirable that the magnetically attractable component remain together with the touch fastener, for example, if the touch fastener is cut or torn during the removal process. A component made up of particulate matter is generally preferred to a single solid component such as a wire. The composition of the, particulate matter is generally more easily disposed to breakage along with the touch fastener, whereas a component made of a solid such as a wire can result in products where the wire remains a solid form, not being broken down and possibly tearing or otherwise damaging equipment during the recycling process.

Magnetically attractive material 1018 may be formed with sections of reduced diameter or may even be partially sectioned for ease of breaking during recycling. Still in other embodiments, magnetically attractive material 1018 may be sectioned into discrete portions adhered to the sheet-form base 1010.

The magnetically attractive component 1018 includes magnetically attractable particles such as iron filings, which are fused together to provide a continuous component that has handling properties similar to a compounded product such as rope. In some embodiments, the magnetically attractive component is held together by the physical bonding of the particles. In some embodiments, the magnetically attractive component includes an adhesive to help hold together the magnetically attractive particles. It is generally preferred that embodiments including an adhesive are produced such that the magnetically attractive component is at least about 50% by weight of the magnetically attractive material (e.g., at least 55%, at least 60%, at least 65%, at least 70%, at least 75%, at least 80%, at least about 85%, at least about 90%, at least about 95%).

Accordingly, other embodiments are within the scope of the following claims.

What is claimed is:

1. A touch fastener comprising:
   a sheet-form base comprising an upper face and a lower face;
   a plurality of fastener elements disposed in an array on the lower face of the sheet-form base; and
   a frangible strand of magnetically attractable composite material secured on the upper face of the sheet-form base, wherein the composite material includes resin and magnetically attractable particles.

2. The touch fastener of claim 1, wherein the magnetically attractable particles are coated onto the resin.

3. The touch fastener of claim 1, wherein the magnetically attractable composite material further comprises an elongated core about which the resin is formed.

4. The touch fastener of claim 3, wherein the core comprises one of a chord, thread, string, and filament.

5. The touch fastener of claim 3 wherein the magnetically attractable particles are adhered to the core.

6. The touch fastener of claim 1, wherein the magnetically attractable composite material includes regions of reduced cross-section to facilitate tearing during recycling.

7. The touch fastener of claim 1, wherein the magnetically attractable composite material is an extruded composite comprising at least about 50% by weight of magnetically attractive particles.

8. The touch fastener of claim 1, further comprising a cover covering the frangible strand of magnetically attractable material and disposed onto the upper face of the base, wherein the cover, when positioned onto the upper face of the base and covering the frangible strand, defines a maximum slope angle of less than about 75°, as measured from the upper surface of the sheet form base to the outside surface of the cover.

9. The touch fastener of claim 8, wherein the maximum slope angle of the cover is less than about 55°.

10. The touch fastener of claim 8, wherein the cover is a film less than about 0.010 inch (0.254 mm) thick.

11. The touch fastener of claim 8, wherein the cover is a woven or a non-woven fabric.

12. The touch fastener of claim 8, wherein the frangible strand of magnetically attractable material extends substantially an entire length of the touch fastener and is substantially centered in a width of the touch fastener.

13. The touch fastener of claim 8, further comprising selvedges extending laterally beyond the away of fastener elements.

14. The touch fastener of claim 13, wherein the selvedges are integrally molded with the base.

15. The touch fastener of claim 8, further comprising selvedges formed from an extension of the cover, extending laterally beyond the array of fastener elements.

* * * * *

UNITED STATES PATENT AND TRADEMARK OFFICE
CERTIFICATE OF CORRECTION

PATENT NO. : 7,648,751 B2  Page 1 of 1
APPLICATION NO. : 11/873124
DATED : January 19, 2010
INVENTOR(S) : Daniel Lee Janzen It is certified that error appears in the above-identified patent and that said Letters Patent is hereby corrected as shown below:

Col. 14, line 56, delete "away" and insert --array--

Signed and Sealed this

Fourth Day of May, 2010

David J. Kappos
*Director of the United States Patent and Trademark Office*